(12) United States Patent
Schiemann et al.

(10) Patent No.: US 11,916,410 B2
(45) Date of Patent: Feb. 27, 2024

(54) BATTERY SYSTEM AND METHOD FOR OPERATING A BATTERY SYSTEM

(71) Applicant: Robert Bosch GmbH, Stuttgart (DE)

(72) Inventors: Werner Schiemann, Fellbach (DE); Joachim Joos, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 597 days.

(21) Appl. No.: 17/264,568

(22) PCT Filed: Sep. 20, 2019

(86) PCT No.: PCT/EP2019/075426
§ 371 (c)(1),
(2) Date: Jan. 29, 2021

(87) PCT Pub. No.: WO2020/058518
PCT Pub. Date: Mar. 26, 2020

(65) Prior Publication Data
US 2021/0336453 A1    Oct. 28, 2021

(30) Foreign Application Priority Data

Sep. 21, 2018   (DE) .......................... 102018216127.5

(51) Int. Cl.
*H02J 7/00* (2006.01)
*H01M 10/42* (2006.01)
*H01M 10/48* (2006.01)

(52) U.S. Cl.
CPC ......... *H02J 7/0013* (2013.01); *H01M 10/425* (2013.01); *H01M 10/482* (2013.01);
(Continued)

(58) Field of Classification Search
CPC ....................................................... H02J 7/0013
(Continued)

(56) References Cited

U.S. PATENT DOCUMENTS 5,422,558 A * 6/1995 Stewart ................. H02J 7/0013
320/120
5,473,635 A   12/1995 Chevroulet
(Continued)

FOREIGN PATENT DOCUMENTS

DE    69700112 T2    6/1999
DE    19916020 A1    10/1999
(Continued)

OTHER PUBLICATIONS

International Search Report for PCT/EP2019/075426, dated Nov. 7, 2019.

*Primary Examiner* — Jerry D Robbins
(74) *Attorney, Agent, or Firm* — NORTON ROSE FULBRIGHT US LLP; Gerard A. Messina

(57) ABSTRACT

A battery system for a motor vehicle. The battery system includes an actuating unit, a main control unit, multiple sub-control units, and multiple battery cells. The actuating unit is in signal communication with the sub-control units for data acquisition from the sub-control units. Each sub-control unit is in signal communication with a battery cell for data acquisition from the assigned battery cell. The main control unit is electrically connected to the sub-control units supplying power to the sub-control units. A method for operating a battery system is also described.

10 Claims, 3 Drawing Sheets

(52) U.S. Cl.
CPC ........ *H02J 7/0016* (2013.01); *H02J 7/00036* (2020.01); *H01M 2010/4278* (2013.01); *H01M 2220/20* (2013.01); *H02J 2207/10* (2020.01)

(58) Field of Classification Search
USPC ........................................................ 320/106
See application file for complete search history.

(56) References Cited

U.S. PATENT DOCUMENTS

| | | | |
|---|---|---|---|
| 9,559,529 B1* | 1/2017 | Button | H02J 7/0018 |
| 2010/0052622 A1* | 3/2010 | Chen | H02J 7/0013 |
| | | | 320/148 |
| 2010/0261048 A1 | 10/2010 | Kim et al. | |
| 2012/0119746 A1* | 5/2012 | Macris | H02J 7/0013 |
| | | | 324/431 |
| 2013/0096762 A1 | 4/2013 | Houchin-Miller et al. | |
| 2014/0365792 A1 | 12/2014 | Yun | |
| 2016/0261127 A1* | 9/2016 | Worry | H02J 7/0029 |
| 2017/0332448 A1 | 11/2017 | Lookman et al. | |

FOREIGN PATENT DOCUMENTS

| | | |
|---|---|---|
| DE | 69837816 T2 | 1/2008 |
| DE | 102010037507 A1 | 4/2011 |
| DE | 102015207302 A1 | 10/2015 |
| WO | 2011127251 A2 | 10/2011 |

\* cited by examiner

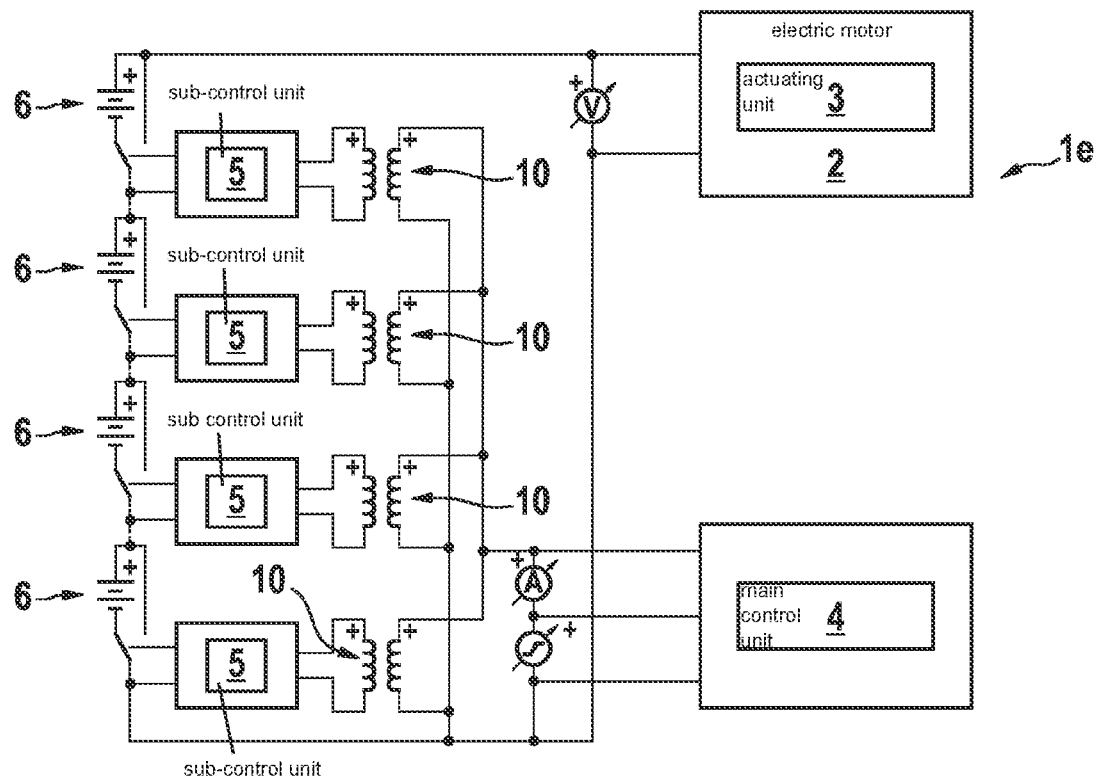

BATTERY SYSTEM AND METHOD FOR OPERATING A BATTERY SYSTEM

FIELD

The present invention relates to a battery system for a motor vehicle and to a method for operating a battery system.

BACKGROUND INFORMATION

The general related art describes various battery systems as a current and voltage source for electric motors. According to one approach, multiple battery cells and/or modules are connected in series to obtain a desirable current and voltage pattern. In the case of a rigid series circuit, which is still frequently installed in conventional systems, a switch-on and switch-off of individual battery cells is difficult to impossible. This results, in particular, in problems with respect to a desirable reliability of the battery system.

A considerable problem with such systems arises due to the communication complexity for the so-called balancing of the individual battery cells. Here, a higher-order control unit including a high data rate must be supplied with the measured values of the individual battery cells and, thereafter, may decide from which battery cell to withdraw power and from which battery cell not to withdraw power. The high data rate arises from the necessity to reach this decision for all battery cells one after the other, since this may not be processed in parallel in the battery system.

These problems may be taken into account, in that one sub-control unit is assigned to each cell level. As a result, the cell level becomes autonomously capable of making decisions.

This means, it is sufficient in this case, for example, to simultaneously specify to the individual control units only a switch-on probability using which these must be switched on. If the voltage made available by the battery cells is too low in summation, the higher-order control unit may increase the probability specification, in order to force further battery cells to switch on. In return, in the case of a reduced supply voltage demand, for example, at a low driving speed, the probability specification may be lowered, in order to enable weaker battery cells to rise to the charge level of the other battery cells. The generic type for operating a battery system is described in U.S. Patent Application Publication No. US 2010/261048 A1.

One difficulty associated with the above-described approach, however, is, moreover, the reliable supply of the individual sub-control units with current. Due to a possible failure of a battery cell assigned to the sub-control unit, the sub-control units are preferably not permitted to be supplied with current from the assigned battery cells. One further difficulty is the bidirectional communication of the individual sub-control units with the higher-order control unit. On the one hand, the individual cell levels must receive the specifications of the higher-order control unit; on the other hand, the higher-order control unit requires information from the individual battery cells.

SUMMARY

In accordance with an example embodiment of the present invention, a battery system is provided, which at least partially takes the above-described problems into account. Moreover, in accordance with an example embodiment of the present invention, a method is provided for operating a battery system of this type. Advantageous specific embodiments of the present invention result from the description and the figures. In this case, features and details which are described in conjunction with the battery system also apply, of course, in conjunction with the method according to the present invention and vice versa in each case, so that, with respect to the alternating disclosure, reference is always made or may always be made to the individual aspects of the present invention.

According to a first aspect of the present invention, a battery system for a motor vehicle is provided. In accordance with an example embodiment of the present invention, the battery system includes an actuating unit, a main control unit, multiple sub-control units, and multiple battery cells, the actuating unit is in signal communication with the sub-control units for data acquisition from the sub-control units and each sub-control unit is in signal communication with a battery cell for data acquisition from the assigned battery cell, and the main control unit being electrically connected to the sub-control units for supplying power to the sub-control units.

Within the scope of the present invention, it was found that the sub-control units may be reliably supplied with current and voltage by a main control unit situated separately from the actuating unit and, simultaneously, an information exchange may be implemented between the sub-control units, the main control unit, and the actuating unit, via the main control unit, in a bidirectional way.

According to an example embodiment of the present invention, a battery system including secondary sub-control units and a higher-order main control unit is provided. For supplying power to the sub-control units, the main control unit may be electrically connected to the sub-control units by a clocked voltage signal. This means, the higher-order main control unit may generate a cycle including a predefinable voltage signal as a pulse sequence, whereby the individual sub-control units are supplied with energy or current and voltage. In extensive tests within the scope of the present invention, it turned out that the main control unit is in signal communication with the sub-control units or with a particular sub-control unit for supplying power to the sub-control units, using a clocked voltage signal including a frequency in a range between 1 kHz and 1 mHz, in particular in a range between 50 kHz and 200 kHz.

The sub-control units each additionally represent, according to the present invention, a current sink. This means, the sub-control units each withdraw not only their own supply of power, but also an additional current from the pulse signal. The current may be similarly withdrawn at a level in a range between 1 mA and 10 mA. Therefore, for example, a piece of information regarding the state of charge (SOC) of the particular battery cell may be communicated to the higher-order main control unit. Since this may be carried out simultaneously for all sub-control units, it is possible to obtain a piece of information, by the higher-order main control unit, regarding the overall available charge or the corresponding current without considerable delays and, in particular, during a regular operation of the battery system. Thereafter, the availability of the overall system may be ascertained during on-going operation on the basis of the level of the total current.

According to an example embodiment of the present invention, each sub-control unit is in direct signal communication, in particular in electrical connection, with a battery cell. A signal communication may be understood, in the present case, to be, in particular, a data link for the bidirectional data exchange. It may, but not necessarily must, be possible for current to be conducted via the signal communication. The electrical connection is to be understood, in the present case, to be a hard-wired, mechanical connection between at least two functional components. Current and voltage, but also, simultaneously, data, may be transmitted via the electrical connection or an appropriate connection line or a connection line system.

The battery system is to be understood, preferably, to be a battery system for supplying power to an electrical drive unit, in particular of an electric motor, for driving the motor vehicle, where the motor vehicle may be appropriately designed as a pure electric vehicle or in the form of a hybrid electric vehicle. A motor vehicle may be understood, in the present case, to be a road vehicle, such as a passenger car and a truck, a rail vehicle, a watercraft, an aircraft, and/or a robot. In addition, the battery system may be utilized in stationary systems, such as safety-relevant battery storage systems.

The actuating unit may be designed in the form of an actuating unit for a drive device of the motor vehicle. In this way, the actuating unit may be configured and designed as an actuating unit or an appropriate control unit of an electric motor of the motor vehicle. In this case, the main control unit is not functionally assigned directly to the electric motor, but rather to the sub-control units and, as a result, to the battery cells.

The data acquisition may be understood to be a simultaneous or chronological measurement and counting, if necessary including a time stamp for measurable or countable data and groups of related data. The main control unit may be directly or indirectly connected to each sub-control unit. This means, at least one further functional component may be situated between the main control unit and the sub-control units.

According to one further specific embodiment of the present invention, it is possible that, in one battery system, the main control unit for supplying power to the sub-control units is electrically connected to the sub-control units by a first signal path and a second signal path, the first signal path and the second signal path each being configured and situated for supplying power to the sub-control units. In the present case, it was discovered that a redundant configuration of the supply of current and power has even more advantages. Due to the fact that the first signal path and the second signal path are each configured and situated for supplying power to the sub-control units, supply and communication between the main control unit and the sub-control units may be protected, in an expanded manner, against failure. In addition, a plausibility check may take place during on-going operation when a piece of information of the one channel or, for example, of the first signal path, is checked via a piece of information of the other channel or of the second signal path. The supply of power may also be checked for redundancy when, for example, the basic current supply necessary for the operation is ensured via the first signal path, although further pulses—and, thereby, analog current information—are ensured via the adjacent second signal path.

It is also possible that, in the case of a battery system according to the present invention, a capacitor or a coil system is situated between the main control unit and each of the sub-control units for a potential isolation between the main control unit and the sub-control units. The voltage-related separation of the individual cell levels capacitively in parallel via capacitors has advantages with respect to a necessary capacitance of the utilized capacitors. Nevertheless, the separation may also be carried out capacitively in series. This results in advantages with respect to the number and electric strength of the capacitors. Alternatively, the separation is also possible via inductive components, such as the aforementioned coil system. The separation may take place in series or in parallel in this case as well. In addition, even further coupling possibilities, such as, for example, via autotransformers, are possible.

An arrangement of a functional component or of a functional module in the form of the capacitor or the coil system between the main control unit and the sub-control units is to be understood to be an arrangement of a first functional component between the main control unit and a first sub-control unit, of a second functional component between the main control unit and a second sub-control unit, and of an arbitrary further functional component between the main control unit and an arbitrary further sub-control unit.

As mentioned above, the capacitors or the coil systems in a battery system according to the present invention may be connected in series or in parallel to one another. Depending on the architecture and the requirements on the present battery system, this may therefore be provided in a particularly adaptable way. In a battery system according to the present invention, it is therefore possible that the capacitors or the coil systems are connected in parallel to one another.

According to one further aspect of the present invention, a method is provided for operating a battery system of the type explained above in detail. Within the scope of the method, the sub-control units are supplied with power by an electrical connection between the sub-control units and the main control unit. Therefore, the method according to the present invention yields the same advantages which have been extensively described with reference to the battery system according to the present invention.

The method may be or will be carried out automatically by a computer program. This means, within the scope of the present invention, a computer program for adjusting or controlling and/or regulating the battery system may be provided, which, stored and/or installed on a medium, is configured and designed for carrying out a method according to the present invention. The computer program may be implemented as a computer-readable instruction code in any suitable programming language, such as, for example, in JAVA, C++, or C. The computer program may be stored on a computer-readable memory medium, such as a data disk, a removable drive, a volatile or non-volatile memory, or an installed memory/processor. The instruction code may program a computer or other programmable devices, such as a control unit, in such a way that the desired functions are carried out. Moreover, the computer program may be or will be provided in a network, such as, for example, the Internet, from which it may be downloaded by a user as necessary. The computer program may be or will be implemented with the aid of a software, as well as with the aid of one or multiple specific electronic circuit(s), i.e., in hardware in the form of a computer program product, or in arbitrary hybrid form, i.e., with the aid of software components and hardware components.

Moreover, it is possible that the sub-control units are supplied with power by an electrical connection between the sub-control units and the main control unit via a clocked voltage signal. An energy source in the form of the battery cells may be dispensed with as a result.

In one further embodiment variant of the present invention, an adjustably pulsed voltage signal may be transmitted, via the main control unit to the sub-control units, as code for ascertaining an operating and/or aging state of the sub-control units. The arrangement of the pulses makes it possible to digitally transmit individual codes to the sub-control units or to one of the sub-control units in each case. Via the code or the codes, for example, defective control units may be prompted to communicate this to the main control unit. Since individual sub-control units may also be directly addressed via codes from the higher-order main control unit, the sub-control units may also selectively inject a current and, in this way, communicate with the higher-order main control unit.

The above-described process may be relatively time-consuming. In tests, which were carried out within the scope of the present invention, it turned out to be advantageous that the codes are transmitted individually from the main control unit directly to the particular sub-control units, this also being carried out during a starting process or a start-up of the battery system. No disadvantageous interactions were detected.

Further measures which improve the present invention result from the following description of some exemplary embodiments of the present invention which is schematically represented in the figures. All features and/or advantages, including design details and spatial arrangements, resulting from the description, and the figures, may be essential to the present invention alone or in highly diverse combinations.

BRIEF DESCRIPTION OF THE DRAWINGS

FIG. 5 shows a block diagram for explaining a battery system according to a fifth specific embodiment of the present invention.

DETAILED DESCRIPTION OF EXAMPLE EMBODIMENTS

Figure 1:
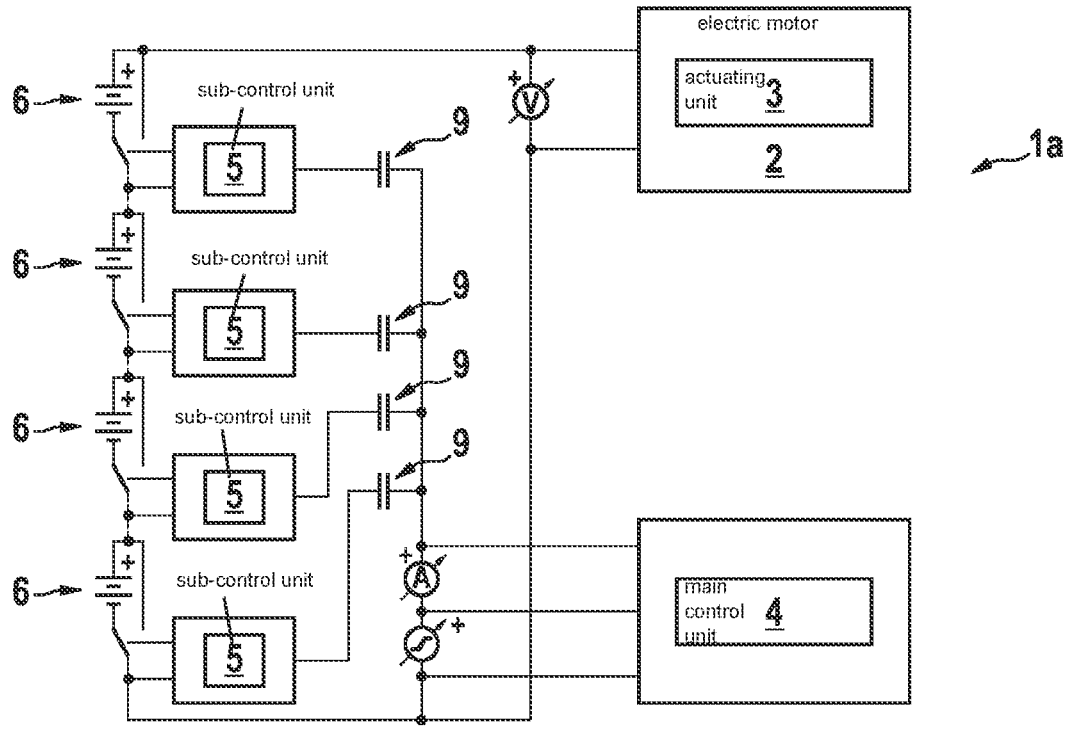
FIG. 1 shows a block diagram for explaining a battery system according to a first specific embodiment of the present invention.

Elements having the same function and mode of operation are each labeled in FIGS. 1 through 5 using the same reference numerals.

FIG. 1 shows a battery system 1a for a motor vehicle according to a first specific embodiment. Battery system 1a includes an actuating unit 3 in the form of a motor control unit for an electric motor 2 of the motor vehicle, a main control unit 4, and multiple sub-control units 5. In addition, the battery system encompasses multiple battery cells 6 assigned to sub-control units 5. Actuating unit 3 is in signal communication with sub-control units 5 for data acquisition from sub-control units 5. Moreover, each sub-control unit 5 is in signal communication with a battery cell 6 for data acquisition from assigned battery cell 6. In addition, main control unit 4 is electrically connected to sub-control units 5 for supplying power to sub-control units 5. Main control unit 4 is electrically connected to sub-control units 5 for supplying power to sub-control units 5 via a clocked voltage signal of approximately 100 kHz. A capacitor 9 is situated between main control unit 4 and each of the sub-control units 5 for the potential isolation between main control unit 4 and sub-control units 5. Capacitors 9 are connected in parallel to one another.

Figure 2:
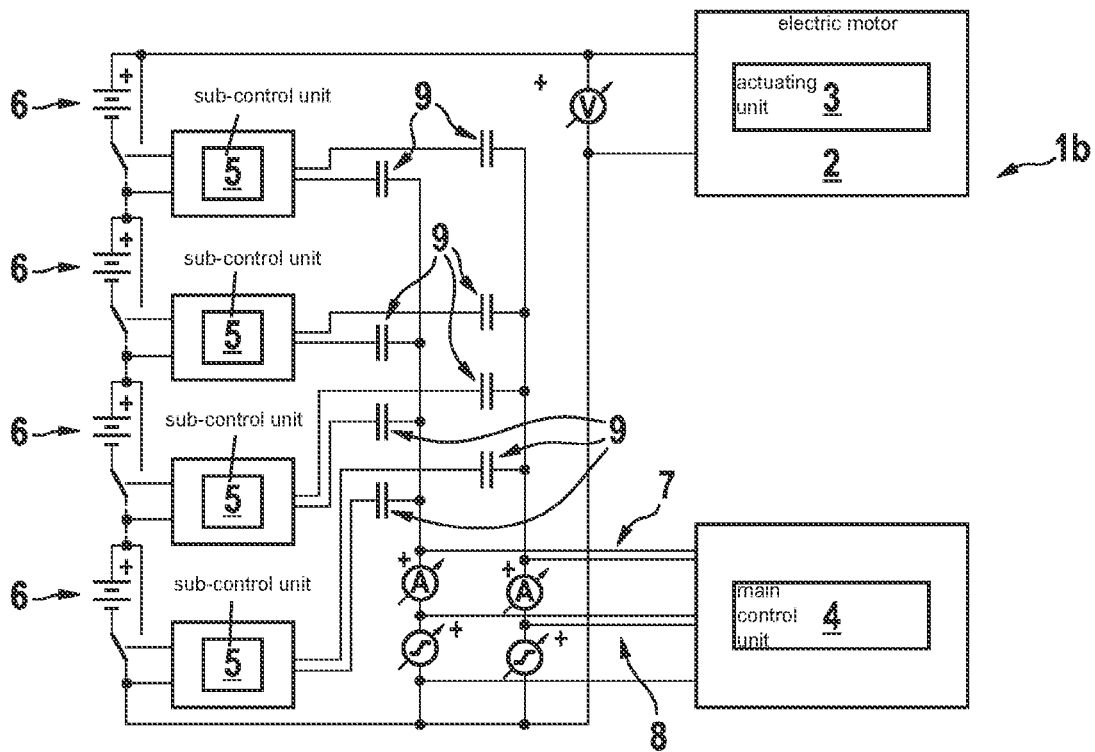
FIG. 2 shows a block diagram for explaining a battery system according to a second specific embodiment of the present invention.

In FIG. 2, a battery system 1b according to a second specific embodiment is represented. In battery system 1b represented in FIG. 2, for supplying power to sub-control units 5, main control unit 4 is electrically connected to sub-control units 5 by a first signal path 7 and a second signal path 8, first signal path 7 and second signal path 8 each being configured and situated for supplying power to the sub-control units 5. Capacitors 9 are connected in parallel to one another.

Figure 3:
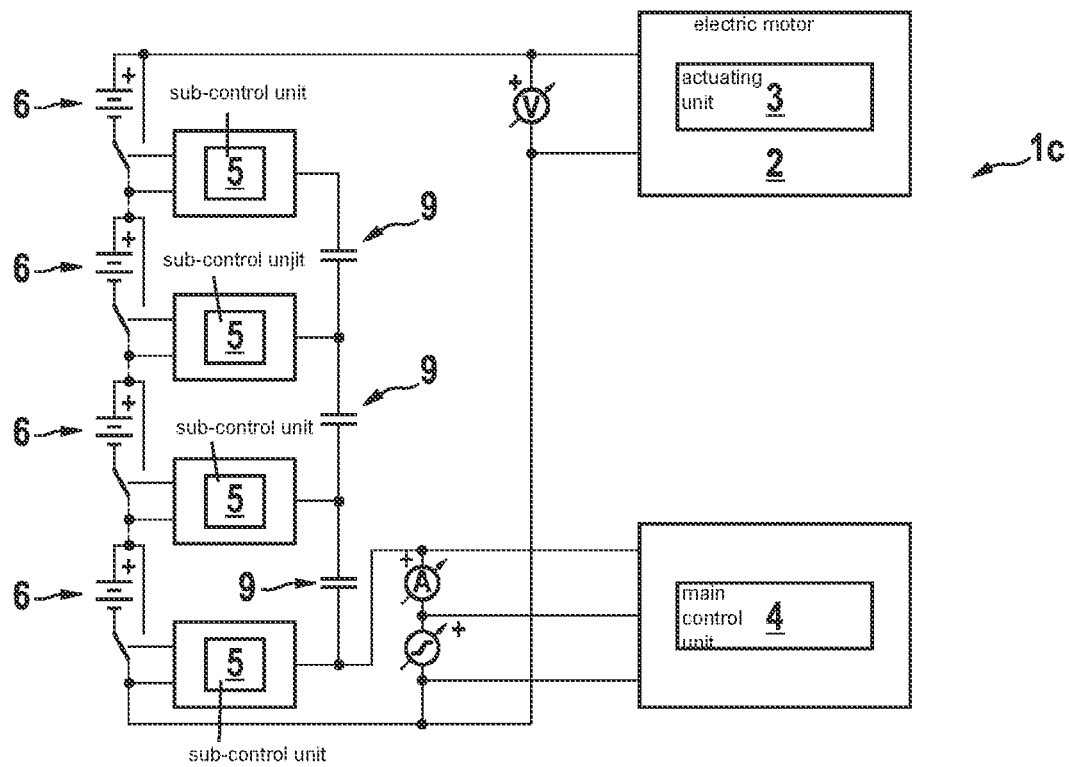
FIG. 3 shows a block diagram for explaining a battery system according to a third specific embodiment of the present invention.

In FIG. 3, a battery system 1c according to a third specific embodiment is represented. In battery system 1c represented in FIG. 3, capacitors 9 are connected in series.

Figure 4:
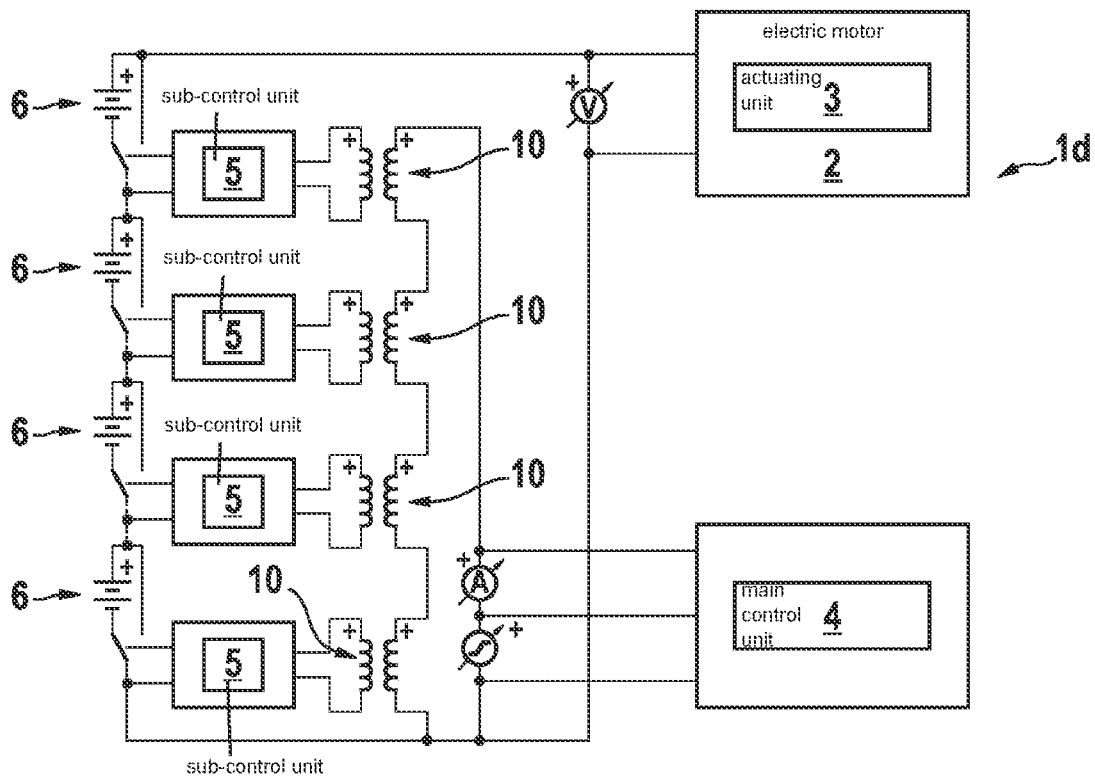
FIG. 4 shows a block diagram for explaining a battery system according to a fourth specific embodiment of the present invention.

FIG. 4 shows a battery system 1d according to a fourth specific embodiment, in which inductive coil systems 10 are provided in place of capacitors 9. According to the specific embodiment represented in FIG. 4, coil systems 10 are connected in parallel to one another.

In FIG. 5, a battery system 1e according to a fifth specific embodiment is represented. In battery system 1e represented in FIG. 5, coil systems 10 are connected in series.

Finally, with reference to FIG. 1, a method for operating represented battery system 1a is explained, in which sub-control units 5 are supplied with power or current and voltage via the electrical connection between sub-control units 5 and main control unit 4. More precisely, sub-control units 5 are supplied with power by the electrical connection between sub-control units 5 and main control unit 4 via a clocked voltage signal. Here, an adjustably pulsed voltage signal is transmitted, as code, by main control unit 4 to sub-control units 5 in order to ascertain an operating state of sub-control units 5, the codes being transmitted individually from main control unit 4 directly to particular sub-control units 5. Since this process may take a relatively large amount of time, this is carried out during a starting process of battery system 1a or during a boot-up of battery system 1a.

The present invention allows for further design principles in addition to the represented specific embodiments. This means, the present invention is not to be considered to be limited to the exemplary embodiments described with respect to the figures.

What is claimed is:

1. A battery system for a motor vehicle, comprising:
   an actuating unit;
   a main control unit;
   multiple sub-control units; and
   multiple battery cells;
   wherein the actuating unit is in signal communication with the sub-control units for data acquisition from the sub-control units, and each of the sub-control units is in signal communication with an assigned battery cell of the battery cells for data acquisition from the assigned battery cell, and wherein the main control unit is electrically connected to the sub-control units for supplying power to the sub-control units.

2. The battery system as recited in claim 1, wherein the main control unit is electrically connected to the sub-control units for supplying power to the sub-control units using a clocked voltage signal.

3. The battery system as recited in claim 1, wherein the main control unit is electrically connected, for the power supply of the sub-control units, to the sub-control units by a first signal path and a second signal path, the first signal path and the second signal path each being configured and situated for supplying power to the sub-control units.

4. The battery system as recited in claim 1, wherein a capacitor or a coil system is situated between the main control unit and each of the sub-control units for a potential isolation between the main control unit and the sub-control units.

5. The battery system as recited in claim 4, wherein the capacitors or the coil systems are connected in series.

6. The battery system as recited in claim 4, wherein the capacitors or the coil systems are connected in parallel to one another.

7. A method for operating a battery system, the battery system including an actuating unit, a main control unit, multiple sub-control units, and multiple battery cells, wherein the actuating unit is in signal communication with the sub-control units for data acquisition from the sub-control units, and each of the sub-control units is in signal communication with an assigned battery cell of the battery cells for data acquisition from the assigned battery cell, and wherein the main control unit is electrically connected to the sub-control units for supplying power to the sub-control units, the method comprising:

supplying the sub-control units with power using an electrical connection between the sub-control units and the main control unit.

8. The method as recited in claim 7, wherein the sub-control units are supplied with power using the electrical connection between the sub-control units and the main control unit via a clocked voltage signal.

9. The method as recited in claim 7, wherein an adjustably pulsed voltage signal is transmitted, by the main control unit to the sub-control units, as codes for ascertaining an operating and/or aging state of the sub-control units.

10. The method as recited in claim 9, wherein the codes are transmitted individually from the main control unit directly to each of the sub-control units, the transmitting being carried out during a starting process of the battery system.

* * * * *